United States Patent Office 3,535,007
Patented Oct. 20, 1970

3,535,007
BEARING
Emil A. Klingler, Alter Bergweg 4, Plochingen, Germany,
Walther Dawihl, Rassweilerweg 3, Illingen, Germany;
and Erhard Dorre, Weiherstrasse 3, Plochingen, Germany
No Drawing. Filed July 3, 1968, Ser. No. 742,197
Claims priority, application Germany, July 8, 1967,
1,625,534
Int. Cl. F16c 33/24; B21d 53/10
U.S. Cl. 308—241                                     7 Claims

ABSTRACT OF THE DISCLOSURE

Bearings whose frictionally engaged elements are faced respectively with pure, sintered aluminum oxide and with titanium dioxide have a long useful life at high temperatures and in a corrosive environment, and sleeve bearings so faced form durable tight seals.

---

This invention relates to friction bearings, and particularly to a combination of frictionally engaged materials in such bearings. The term "bearing," as employed in this specification and the appended claims will be understood to include conformingly engaged elements such as the rings of a slide ring seal.

Sintered polycrystalline aluminum oxide has been found heretofore to have uniquely favorable properties as a bearing material where a combination of wear resistance and corrosion resistance is called for, for example, in pumps for the chemical industry and in rocket propulsion apparatus. The performance of such bearings, however, is determined also by the properties of the other bearing partner which frictionally engages the aluminum oxide body such as a bearing ring or an annular seal.

The bearing partners combined with aluminum oxide most frequently prior to the instant invention were based on carbon and compared unfavorably with aluminum oxide in their resistance to heat and oxidizing agents, particularly when under heavy load.

The primary object of this invention is the provision of a bearing partner for sintered aluminum oxide which is properly matched with the aluminum oxide in its hardness and its wear resistance, and also favorably affects the running-in properties of the bearing. It should also have adequate thermal conductivity to dissipate the heat generated by friction in the bearing.

It has now been found that bearings meeting highest requirements in all respects discussed above are obtained if sintered polycrystalline aluminum oxide as one bearing partner is frictionally engaged by another bearing partner at least faced with titanium dioxide, the quality of the bearing improving with the purity of the aluminum oxide employed.

The corrosion resistance of titanium dioxide bodies is similar to that of aluminum oxide. The hardness of titanium dioxide is approximately one half of the hardness of sintered aluminum oxide. The titanium dioxide partner is thus hard enough to withstand wear under mechanical stresses, but soft enough to permit the aluminum oxide partner to run itself in. If the two bearing partners are coaxial sealing rings in abutting engagement, a tight and permanent seal is formed. The running properties of such a seal are good even at high temperatures and without the use of lubricants.

In bearings in which both partners are aluminum oxide, it is a matter of chance which bearing partner will fail first and require to be replaced. In the bearings of this invention, the aluminum oxide member invariably outlives the titanium dioxide partner, and the latter material is chosen for that part of the bearing which is more readily accessible for replacement. The relatively soft titanium dioxide particles formed by gradual break-down have relatively little abrasive effect on the bearing elements as compared to aluminum oxide particles.

Titanium dioxide can be shaped in a known manner by compressing titanium dioxide powder in a mold with a temporary binder. The green compact so obtained is then sintered at 1300° to 1500° C., to a polycrystalline body. If the starting material is comminuted anatas, the power is preferably subjected to a preliminary heat treatment at about 1000° C. for several hours to convert its crystal lattice to a more stable modification. If anatas powder is not so pretreated, the sintered bodies tend to crack.

If relatively large bearing elements are to be prepared, it is usually advantageous to apply the titanium dioxide to a metal base. Even a thin titanium dioxide coating applied by flame spraying in a known manner has a long useful life. An oxygen-acetylene torch or a plasma torch may be employed for spraying.

Bearing sleeves, sealing rings, and similar aluminum oxide bearing elements for use in this invention are prepared in a known manner by sintering compacts of aluminum oxide powder at temperatures near 1900° C. Their corrosion resistance is inversely related to the amount of impurities present. A minimum of 95% $Al_2O_3$ is required for high corrosion resistance, and further improvement is achieved by purifying the starting material to as much as 99.9% $Al_2O_3$.

The hardness, wear resistance, and microscopic structure of the titanium dioxide partner can be favorably influenced by admixing minor amounts of other oxide to the titanium dioxide powder prior to shaping. Oxides of the alkaline earth metals, the earth metals, the metals of Group VI of the Periodic Table of Elements, particularly chromium, and of manganese have been employed successfully in amounts of up to 10%.

Small amounts of corrosion resistant metals such as tungsten or molybdenum may be dispersed in the titanium dioxide body to enhance the thermal conductivity thereof if heat dissipation is important. It is convenient to admix oxides or other compounds of tungsten or molybdenum to the titanium dioxide powder prior to compacting, and to sinter the green compact in a reducing atmosphere capable of converting the compounds to the metals.

If the use of liquid lubricants is contemplated, the titanium dioxide element of the bearing should have some porosity, not more than 10%, so that the lubricant may be partly absorbed in the titanium dioxide element. This is of importance particularly in shatts rotating at high speed. The desired porosity of the titanium dioxide partner is achieved by suitably selecting the composition of the initial titanium dioxide powder and its grain size composition, or by adjusting the sintering conditions.

What is claimed is:

1. In a bearing having two frictionally engaged elements arranged for relative movement, one of the elements essentially consisting of sintered polycrystalline aluminum oxide, the improvement in the other element which comprises at least a facing on said other element in frictionally movable engagement with said aluminum oxide, said facing consisting essentially of a polycrystalline body of titanium dioxide.

2. In a bearing as set forth in claim 1, said facing including not more than 10 percent of an oxide of an alkaline earth metal, an earth metal, a metal of the Sixth Group of the Periodic Table of Elements, or manganese.

3. In a bearing as set forth in claim 1, said facing containing a finely dispersed corrosion resistant metal.

4. In a bearing as set forth in claim 1, said titanium dioxide being polycrystalline and sintered.

5. In a bearing as set forth in claim 1, said other element having a metal base carrying said facing.

6. In a bearing as set forth in claim 5, said facing being thin as compared to said metal base.

7. In a bearing as set forth in claim 1, said facing having a porosity of not more than ten percent.

References Cited

UNITED STATES PATENTS

| | | | |
|---|---|---|---|
| 2,206,395 | 8/1938 | Gertler | 308—237 |
| 2,648,573 | 8/1953 | Wheildon | 308—237 X |
| 2,934,480 | 4/1960 | Slomin | 308—241 |
| 3,022,685 | 2/1962 | Armacost. | |
| 3,155,439 | 11/1964 | Guzewicz | 308—241 |
| 3,284,144 | 11/1966 | Moore | 308—3 |
| 3,297,552 | 1/1969 | Gisser | 29—198 X |
| 3,428,374 | 2/1969 | Orkin | 308—72 X |
| 2,760,925 | 8/1956 | Bryant | 308—241 X |

FOREIGN PATENTS

| | | |
|---|---|---|
| 870,170 | 6/1961 | Great Britain. |
| 1,023,007 | 3/1966 | Great Britain. |

OTHER REFERENCES

"Developments to Watch," Product Engineering, Apr. 24, 1961, page 9.

WESLEY S. RATLIFF, JR., Primary Examiner

U.S. Cl. X.R.

29—149.5; 308—237